June 22, 1948.  M. MATUSZEWSKI  2,443,629
RELEASABLE CONNECTING MECHANISM
Filed Jan. 22, 1947  2 Sheets-Sheet 1
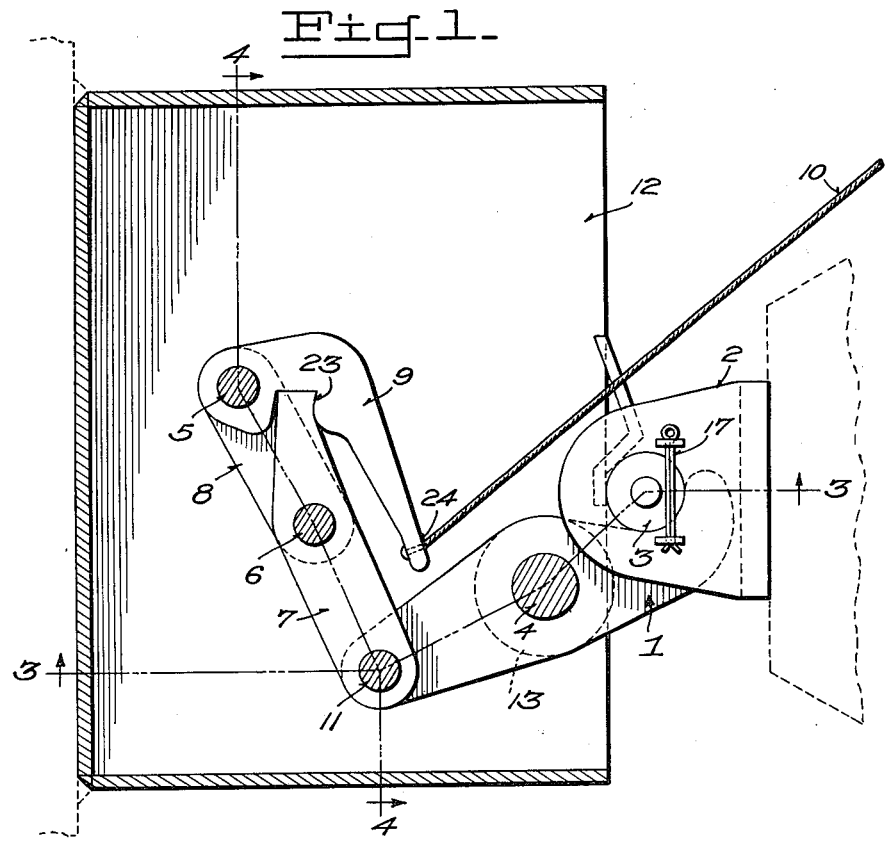
Inventor
MICHAEL MATUSZEWSKI, June 22, 1948.  M. MATUSZEWSKI  2,443,629
RELEASABLE CONNECTING MECHANISM
Filed Jan. 22, 1947  2 Sheets-Sheet 2
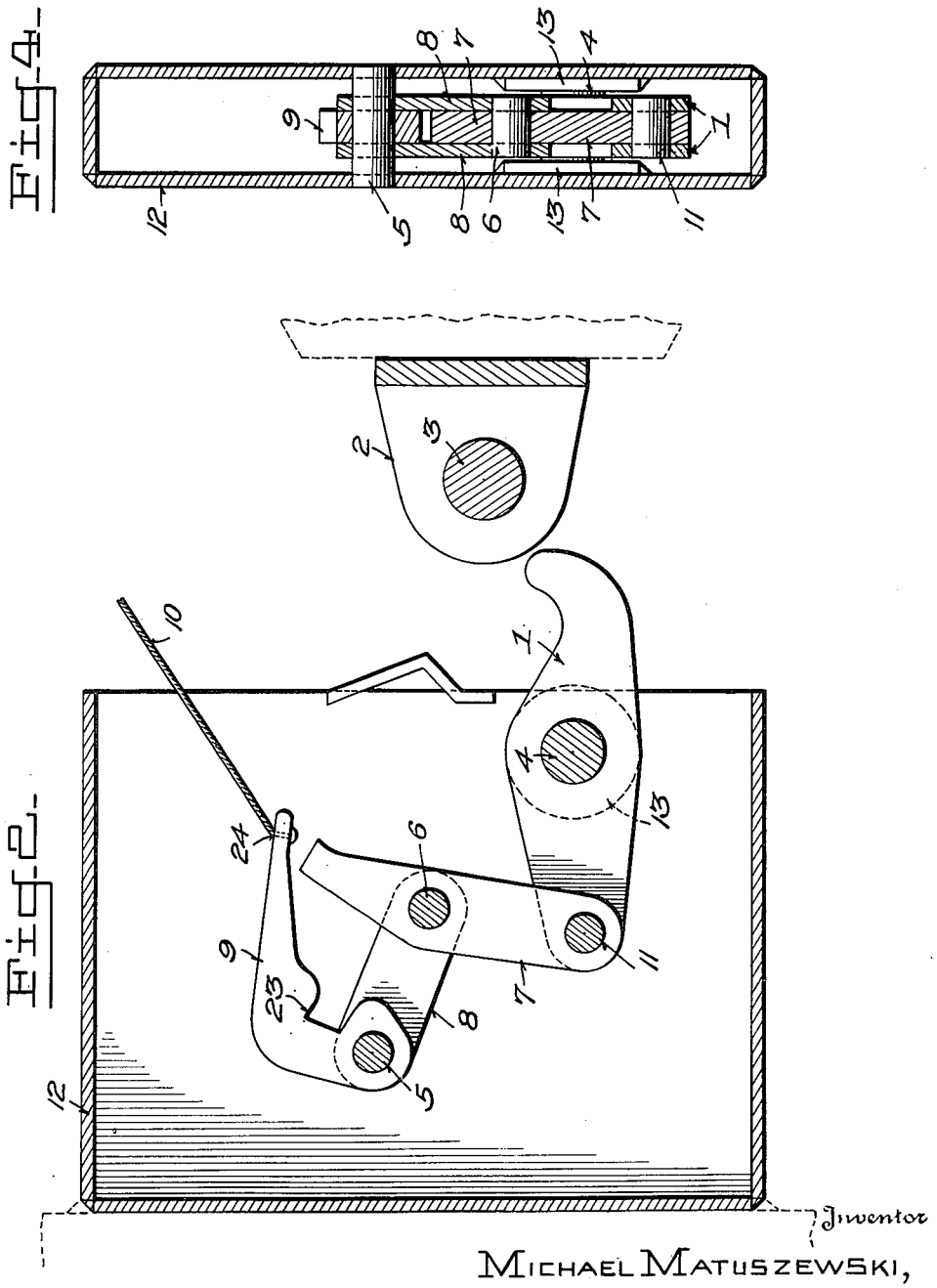
Inventor
MICHAEL MATUSZEWSKI, Patented June 22, 1948

2,443,629

UNITED STATES PATENT OFFICE 2,443,629

RELEASABLE CONNECTING MECHANISM

Michael Matuszewski, Detroit, Mich., assignor to the United States of America as represented by the Secretary of War Application January 22, 1947, Serial No. 723,473

12 Claims. (Cl. 114—221)

(Granted under the act of March 3, 1883, as amended April 30, 1928; 370 O. G. 757)

The invention described in the following specification and claims may be manufactured and used by or for the Government for governmental purposes without the payment to me of any royalty thereon.

The present invention relates to a connecting mechanism which is quickly and easily releasable, and it is particularly applicable in cases where it may be necessary to quickly and easily separate from connection two bodies which are connected under a great force, for example a force which may be of many thousands of pounds.

An illustration of the applicability of the present invention is where floats or pontoons are connected to combat vehicles such as tanks for the crossing of deep bodies of water or for ship to shore movement during combat. Under such conditions, when a combat vehicle approaches land and the supporting pontoons are no longer required, it is necessary to quickly release the latter, even though in the case of a heavy combat tank the force acting on a connection between a pontoon and the tank may be very great, for example up to 70,000 pounds or more.

It has heretofore been proposed that such necessary releasable connecting mechanism involve a yoke welded or secured to one body, for example the float or pontoon, and a bracket welded or secured to the other body, for example a tank, and adapted to be received by the yoke. The yoke and bracket have apertures therethrough, and when the bracket is received by the yoke these apertures may be aligned whereupon connection is accomplished by insertion therethrough of a release pin having at one end thereof a cartridge plug containing a filament and powder charge, the filament being electrically connected to a switch. In such construction, when disconnection is desired under conditions such as when the connection is under a very high load, the switch is closed thus closing a circuit and permitting a current to pass through the filament of the cartridge charge causing melting of the filament and the setting off of the powder charge in the cartridge plug, which in turn blows out the release pin whereupon disconnection is accomplished.

While the above described heretofore proposed connecting mechanism would appear to afford quick release when desired, it possesses certain inherent disadvantages. Thus, the powder charge in the cartridge plug has a possibility of becoming wet and failing to blow out the release pin; in the case of a combat tank with floats connected and under fire, such failure would result in inability of the tank to proceed, and may result in possible loss of the tank. Also, in such construction, all wiring and circuits must be checked before each operation and at a time when the period of time required for such checking possibly cannot be spared, and even such checking will not positively insure against failure. In addition, the cartridge plug has to be replaced after each release, the continued functioning of the construction being thus dependent upon an adequate supply at hand of cartridge plugs. Moreover, the release pin is lost in each operation, necessitating an additional and adequate supply of release pins. These disadvantages become even more apparent when it is realized that a plurality of connections may be necessary, involving a corresponding plurality of cartridge plugs and release pins for each operation.

Accordingly, it is an object of the present invention to provide a releasable connecting mechanism which has the advantage of being quickly and easily releasable though the connection be under great force, without the above described disadvantages of the construction heretofore proposed.

It is a further object of this invention to provide a connecting mechanism comprising a manually operable device to insure quick, easy and positive release of the mechanism when desired, thus insuring quick, easy and positive separation of two bodies which may be connected under great force by the mechanism.

It is a further object of this invention to provide in combination with mechanism designed for the connection of two bodies, the connection being under great force, electrical means associated with said mechanism to release the connection, and mechanical means associated with said mechanism to insure the release of said connection by quick and easy manual operation.

It is a further object of this invention to provide a releasable connecting mechanism for connecting two bodies, said mechanism comprising a connecting pin slidably associated with one of said bodies, a pivotally mounted hook member associated with the other of two bodies and adapted to engage said connecting pin whereby said two bodies are connected, manually operable means for quickly and easily disengaging said hook member from said connecting pin to separate said two bodies, and means for quickly removing said connecting pin to separate said two bodies.

It is a further object of this invention to provide in combination with an armored vehicle and floats for floating said vehicle when connected thereto, releasable connecting mechanism for releasably connecting each of said floats to said vehicle, said mechanism comprising a slidable connecting pin on said vehicle, a hook member pivotally mounted on a float and adapted to releasably engage said pin whereby said float is connected to said vehicle, means for quickly and slidably removing said pin for disconnecting said float from said vehicle, and manually operable means associated with said hook member for quickly and easily disengaging said hook member from said pin for separating said float from said vehicle.

The specific nature of the invention as well as other objects and advantages thereof will be apparent from a description of a preferred embodiment as shown in the accompanying drawing in which similar characters of reference indicate similar parts throughout the several views:

Figure 1 is a view in elevation partly in section, of my releasable connecting mechanism showing component parts thereof in connected relation.

Figure 2 is a view in elevation similar to Figure 1, but showing the component parts of the mechanism in released relation with respect to the manually operable release means.

Figure 3 is a sectional view on a plane indicated by the line 3—3 of Figure 1.

Figure 4 is a sectional view on a plane indicated by the line 4—4 of Figure 1.

With particular reference to the drawing, yoke 2, which may be a casting or fabricated of steel plates welded together, is adapted to be welded at the closed end thereof to a body such as a tank vehicle (not shown). A steel connecting pin 3 is insertable through holes in yoke 2, and is held in place at one end by means of cotter pin 17 on the exterior of yoke 2. A screw cartridge plug 18, hereinafter more fully described, serves to maintain connecting pin 3 in place at its opposite end in yoke 2.

An open ended housing 12, which may be fabricated of steel plates by welding, is adapted to be secured at its closed end, as by welding, to a second body such as a metal float (not shown). A hook member 1, with its hook end extending from the open end of housing 12 and adapted to engage connecting pin 3 for connecting the two bodies, as shown in Figure 1, is pivotally mounted on hook pin 4 extending through the sides of housing 12 and bosses 13 therein. Lower toggle link 7 inside housing 12 is pivotally mounted at one end thereof on pin 11 extending through a clevis portion of the opposite end of hook member 1. An open upper toggle link 8 is pivotally mounted at one end thereof on both sides of lower toggle link 7 on toggle pin 6 extending through a central portion of toggle link 7, the upper portion of toggle link 7 extending upwardly through both sides of upper toggle link 8. The opposite end of upper toggle link 8 is mounted on toggle support pin 5 extending through both sides of housing 12. Locking arm 9 in housing 12 is pivotally mounted at one end thereof to toggle support pin 5 between the sides of the upper end of upper toggle link 8 which as above stated is also mounted on toggle support pin 5. A cam surface 23 on the upper portion of locking arm 9 corresponds to, for coacting therewith, a similar cam surface adjacent the upper end on lower toggle link 7. A release cable 10 is secured at a point 24 at the lower depending end of locking arm 9. Hook member 1, toggle links 7 and 8, and locking arm 9 may be fabricated of steel plates or of castings.

As hereinbefore stated, screw cartridge plug 18 is secured in yoke 2 adjacent one end of connecting pin 3. Inside metallic cartridge housing 19 of screw cartridge plug 18 is a filament 20 and a powder charge 21. One end of filament 20 is grounded at 22 to yoke 2 through wire 16, the other end of filament 20 being connected through wire 15 to one pole of a manually operable switch 14. The remaining pole of switch 14 is connected through wire 27 to one terminal of a source of current such as battery 25 with its opposite terminal grounded at 26.

Assuming that a first unit, such as a tank vehicle, having yoke 2 secured thereon, and a second unit, such as a float, having housing 12 including its mechanism secured thereon, are connected by my releasable connecting mechanism in connected position as illustrated in Figure 1, and that it is suddenly desired that the first unit be quickly separated from the second unit, such separation may be easily and quickly accomplished even though the connection be under a force of up to 70,000 pounds, or more. Such separation may be accomplished by either of two means provided: by mechanical release through manual pulling on release cable 10, or by blowing out connecting pin 3 through manual closing of switch 14. Both release cable 10 and switch 14 may be located in the first unit, for example a tank vehicle, in a position of ready access.

To separate two units, connected as above described by my mechanism, by mechanical release, it is necessary only to pull on release cable 10. Although the releasing device may be designed to release under any required loads, one such device constructed in accordance with this disclosure separated two bodies connected under a force of approximately 70,000 pounds with a pull of approximately only 6 pounds on cable 10, thus illustrating the ease with which separation may be positively accomplished. A pull on cable 10 pulls locking arm 9 which rotates on toggle support pin 5, unlocking the upper part of lower link 7 followed by cam surface 23 on locking arm 9, thus forcing the upper part of link 7 out and permitting a relative folding of toggle links 7 and 8 whereby hook member 1 pivots on hook pin 4 and the hook end of hook member 1 moves downwardly from connecting pin 3, causing separation.

Assuming that with two units, connected as above described, it is desired to separate the units by blowing out connecting pin 3, a manual closing of switch 14 is designed to accomplish the separation, even though the units be connected under great force. When switch 14 is closed an electric circuit is closed sending a current through filament 20 of cartridge plug 18, causing the filament to melt and the setting off of powder charge 21, thus blowing out connecting pin 3 and disconnecting the two units.

It will thus be seen that I have devised a connecting mechanism which is quickly and easily releasable. As above indicated, this mechanism is of particular importance where positive quick release is essential. It may be desired preferably to relay primarily upon the mechanical release mechanism, by pulling on release cable 10, since this overcomes the above disadvantages inherent in a simple blowing out of the connecting pin: necessary loss and replacement of cartridge plugs and connecting pins, necessary checking of wiring and circuits, and possible failure of the cartridge due to the powder charge becoming wet.

Thus if reliance is placed primarily upon the mechanical release, the apparatus providing for blowing out of the connecting pin can be relied upon secondarily as insurance of separation in the event of any unforseen difficulties in operation of the mechanical release. Conversely, if desired, reliance can be placed, as heretofore proposed, primarily upon the blowing out of the connecting pin for quick separation; in such case the mechanical release mechanism operated by a pull on release cord 10 cooperates to provide reliable insurance against release failure by providing for quick and easy positive separation should the electrical circuits or wiring, or the cartridge plug and powder charge fail because of wetness or for any reason.

It will be understood that a plurality of the releasable connecting mechanisms described may be used in releasably connecting two or more units or bodies. Thus, in the case of a heavy tank vehicle connected to a plurality of floats, a plurality of the connecting mechanisms may be used, one or more for each float. In such cases, where a plurality of my mechanisms are utilized, the release cables 10 from all the mechanisms may be interconnected, whereby separation of all units may be accomplished simultaneously; similarly, one switch 14 may be connected to all cartridge elements whereby all connecting pins are blown at the same time for simultaneous separation of all units.

The releasable connecting mechanism herein described is simple for production. The principal wearing parts are encased in housing 12, affording protection against damage, particularly against water and mud in the case of water operations.

While I have illustrated and described a preferred embodiment of my invention, it is understood that many modifications may be made without departing from the spirit of the invention, and I do not wish to be limited to the precise details of construction as set forth, but desire to avail myself of all changes within the scope of the appended claims.

What I claim is:

1. In mechanism of the type described for releasably connecting a first body to a second body, a connecting pin adapted to be supported by said first body, a pivotally mounted member adapted to be supported by said second body, said pivotally mounted member being adapted at one end thereof to connectingly engage said connecting pin, a link pivotally mounted at one end thereof to the opposite end of said pivotally mounted member, a locking member pivotally mounted adjacent the opposite end of said link, said locking member being adapted to releasably lock said link in fixed position and to thereby retain said pivotally mounted member in connected engagement with siad connecting pin, and manually operable means for releasing said locking member from locked position.

2. In mechanism of the type described for releasably connecting a first body to a second body, a removable connecting pin adapted to be supported by said first body, a pivotally mounted member hook-shaped at one end and adapted to be supported by said second body, said pivotally mounted member at its hook-shaped end being adapted to connectingly engage said removable connecting pin, a link pivotally mounted at one end thereof to the opposite end of said pivotally mounted member, a releasable locking member pivotally mounted adjacent the opposite end of said link for releasably locking said link in fixed position whereby said pivotally mounted member is maintained in connecting engagement with said connecting pin, and manually operable means connected to said locking member for releasing the latter from locked position.

3. In mechanism of the type described for releasably connecting a first body to a second body, a removable connecting pin adapted to be supported by said first body, a pivotally mounted member hook-shaped at one end and adapted to be supported by said second body, said pivotally mounted member at its hook-shaped end being adapted to connectingly engage said removable connecting pin, a link pivotally mounted at one end thereof to the opposite end of said pivotally mounted member, a releasable locking member pivotally mounted adjacent the opposite end of said link for releasably locking said link in fixed position whereby said pivotally mounted member is maintained in connecting engagement with said connecting pin, manually operable means connected to said locking member for releasing the latter from locked position, and explosive means adjacent one end of said connecting pin for removing the latter from connecting engagement with said pivotally mounted member.

4. In mechanism of the type described for releasably connecting a first body to a second body, a removable connecting pin adapted to be supported by said first body, manually releasable mechanism adapted to be supported by said second body and including a member thereof adapted to connectingly engage said removable connecting pin, an explosive charge adjacent one end of said connecting pin, and means including an electrical circuit for igniting said explosive charge, whereby said connecting pin may be removably blown from connecting engagement with said member.

5. In mechanism of the type described for releasably connecting a first body to a second body, a yoke adapted to be secured at the closed end thereof to said first body, a removable connecting pin slidably insertable through the side members of said yoke and extending through the space therebetween, means adjacent one end of said connecting pin for preventing the latter from working out from said yoke, a cartridge plug comprising a filament and explosive charge adjacent the opposite end of said connecting pin, manually releasable mechanism adapted to be supported by said second body and comprising a member thereof adapted to connectingly engage said connecting pin between the side members of said yoke, and an electrical circuit including a switch connected to said filament of said cartridge plug for igniting said explosive charge therein, whereby said connecting pin may be blown out from said yoke.

6. In mechanism of the type described for releasably connecting a first body to a second body, the construction as set forth in claim 5 in which said means adjacent one end of said connecting pin for preventing the latter from working out from said yoke comprises a cotter pin.

7. In mechanism of the type described for releasably connecting a first body to a second body, a removable connecting pin adapted to be supported by said first body, a housing adapted to be supported by said second body, a hook member pivotally mounted in said housing, said hook member including an end portion extending from said housing adapted to connectingly engage said removable connecting pin, a first toggle link in said housing pivotally mounted at one end thereof to the opposite end of said hook member, a releasable locking arm pivotally mounted at one end thereof in said housing adjacent the opposite end of said first toggle link, said locking arm being adapted to releasably lock said first toggle link in fixed position whereby said pivotally mounted hook member is maintained in connecting engagement with said removable connecting pin, a second toggle link pivotally mounted at one end thereof to a point in a central portion of said first toggle link and mounted at its opposite end in said housing adjacent the point therein where said locking arm is pivotally mounted, and manually operable means connected to said locking member for releasing the latter from locked position.

8. In mechanism of the type described for releasably connecting a first body to a second body, the construction as set forth in claim 7, in which said manually operable means connected to said locking member for releasing the latter from locked position comprises a manually pullable release cable.

9. In mechanism of the type described for releasably connecting a first body to a second body, a removable connecting pin adapted to be supported by said first body, a housing adapted to be supported by said second body, a hook member pivotally mounted in said housing, said hook member including an end portion extending from said housing adapted to connectingly engage said removable connecting pin, a first toggle link in said housing pivotally mounted at one end thereof to the opposite end of said hook member, a releasable locking arm pivotally mounted at one end thereof in said housing adjacent the opposite end of said first toggle link, said locking arm being adapted to releasably lock said first toggle link in fixed position whereby said pivotally mounted hook member is maintained in connecting engagement with said removable connecting pin, a second toggle link pivotally mounted at one end thereof to a point in a central portion of said first toggle link and mounted at its opposite end in said housing adjacent the point therein where said locking arm is pivotally mounted, manually operable means connected to said locking member for releasing the latter from locked position, and means comprising a cartridge plug adapted to be positioned adjacent one end of said removable connecting pin and an electrical circuit including a manually operable switch adapted to be connected to said cartridge plug, whereby said removable connecting pin may be blown out of connecting engagement with said hook member.

10. In mechanism of the type described for releasably connecting a first body to a second body, a yoke adapted to be secured at the closed end thereof to said first body, a removable connecting pin slidably insertable through the side members of said yoke and extending through the space therebetween, means adjacent one end of said connecting pin for preventing the latter from working out from said yoke, a cartridge plug comprising a filament and explosive charge adjacent the opposite end of said connecting pin, a housing adapted to be supported by said second body, a hook member pivotally mounted in said housing, said hook member including an end portion extending from said housing adapted to connectingly engage said removable connecting pin, a first toggle link in said housing pivotally mounted at one end thereof to the opposite end of said hook member, a releasable locking arm pivotally mounted at one end thereof in said housing adjacent the opposite end of said first toggle link, said locking arm being adapted to releasably lock said first toggle link in fixed position whereby said pivotally mounted hook member is maintained in connecting engagement with said removable connecting pin, a second toggle link pivotally mounted at one end thereof to a point in a central portion of said first toggle link and mounted at its opposite end in said housing adjacent the point therein where said locking arm is pivotally mounted, and manually operable means connected to said locking member for releasing the latter from locked position.

11. In combination with two bodies, a removable connecting pin carried by one of said two bodies, a pivotally mounted member carried by the other of said two bodies and adapted to connectingly engage said removable connecting pin, manually operable means connected to said pivotally mounted member for manually releasing the latter from connecting engagement with said removable connecting pin, and explosive means adjacent said removable connecting pin for blowing the latter out of connecting engagement with said pivotally mounted member.

12. In combination, a heavy body, floats of sufficient buoyancy to cause floating of said heavy body when connected thereto, removable connecting pins supported on said heavy body, a releasable engaging member supported on each of said floats and adapted to connectingly engage one of said removable connecting pins, a locking member associated with each said engaging member for locking the latter in connecting engagement with one of said removable connecting pins, manually operable means connected to said locking member for manually releasing the latter from locked position, and means adjacent one end of each of said removable connecting pins for blowing the latter out of connecting engagement with said engaging members.

MICHAEL MATUSZEWSKI.